United States Patent
Orsborn et al.

(10) Patent No.: US 7,146,789 B2
(45) Date of Patent: Dec. 12, 2006

(54) WALK-BEHIND COTTON HARVESTER

(75) Inventors: Jesse H. Orsborn, Port Bryon, IL (US); Kevin S. Richman, Sherrard, IL (US); Monroe C. Barrett, Geneseo, IL (US); Scott W. Tenbrink, Bettendorf, IA (US)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 11/158,251

(22) Filed: Jun. 21, 2005

(65) Prior Publication Data

US 2005/0229569 A1    Oct. 20, 2005

Related U.S. Application Data

(60) Continuation of application No. 10/420,297, filed on Apr. 22, 2003, which is a continuation-in-part of application No. 09/901,191, filed on Jul. 9, 2001, now abandoned, and a division of application No. 09/511,462, filed on Feb. 23, 2000, now Pat. No. 6,408,605.

(60) Provisional application No. 60/122,069, filed on Mar. 1, 1999.

(51) Int. Cl.
    *A01D 46/08*    (2006.01)

(52) U.S. Cl. .................. 56/28; 56/33; 56/36; 56/40; 56/50

(58) Field of Classification Search ............ 56/28, 56/33, 36, 40, 41, 48–50
See application file for complete search history.

(56) References Cited

U.S. PATENT DOCUMENTS

| | | | |
|---|---|---|---|
| 1,451,090 A * | 4/1923 | Wilson | 56/13.2 |
| 1,763,607 A * | 6/1930 | Watkins | 56/48 |
| 2,025,514 A * | 12/1935 | Johnston | 56/36 |
| 2,493,564 A * | 1/1950 | Arneson | 56/50 |
| 2,644,286 A * | 7/1953 | Nisbet | 56/48 |
| 2,796,716 A * | 6/1957 | Hubbard | 56/50 |
| 3,031,828 A | 5/1962 | Graham | 56/14 |
| 4,249,365 A | 2/1981 | Hubbard et al. | 56/13.2 |
| 4,341,423 A | 7/1982 | Fachini et al. | 298/18 |
| 4,538,403 A | 9/1985 | Fachini | 56/44 |
| 4,722,173 A | 2/1988 | Covington et al. | 56/15.9 |
| 4,896,492 A | 1/1990 | Junge et al. | 56/28 |
| 4,914,897 A | 4/1990 | Orsborn | 56/13.2 |
| 4,922,695 A | 5/1990 | Covington et al. | 56/40 |
| 4,958,482 A * | 9/1990 | Soldavini | 56/14.3 |
| 4,993,216 A | 2/1991 | Covington et al. | 56/15.9 |
| 5,519,988 A * | 5/1996 | Copley et al. | 56/30 |
| 5,557,910 A | 9/1996 | Del Rosario | 56/30 |
| 5,822,961 A | 10/1998 | Busboom | 56/11.4 |
| 5,850,727 A | 12/1998 | Fox | 56/1 |

* cited by examiner

*Primary Examiner*—Thomas B. Will
*Assistant Examiner*—Alicia Torres
(74) *Attorney, Agent, or Firm*—Michael G. Harms; John William Stader; Stephen A. Bucchianeri (57) ABSTRACT

The cotton harvester includes a cotton picker housing having at least one plant lifter defining a plant row channel extending back into the housing to a plant compressor sheet. A picker rotor is mounted in the cotton picker housing adjacent to the plant row channel and traverse to the plant compressor sheet. A doffer in the housing near the picker rotor removes picked cotton from the picker rotor and moves the picked cotton to an outlet at the rear of the cotton picker housing. A power unit includes an internal combustion engine mounted on the housing including a rotatable output selectably connectable in rotatably driving relation to the picker rotor and the doffer for imparting rotation thereto. The power unit can also selectably drive at least one wheel of the harvester for moving it over the ground at a speed corresponding to a rotational speed of the picker rotor.

16 Claims, 6 Drawing Sheets

WALK-BEHIND COTTON HARVESTER

CROSS REFERENCE TO RELATED PATENT APPLICATIONS

This application is a Continuation of patent application Ser. No. 10/420,297, filed Apr. 22, 2003, which is a Continuation-In-Part of patent application Ser. No. 09/901,191 (now abandoned), filed Jul. 9, 2001, which claims the benefit of U.S. provisional application Ser. No. 60/122,069 (now expired), filed Mar. 1, 1999, and is a Divisional application of U.S. application Ser. No. 09/511,462, filed Feb. 23, 2000, now U.S. Pat. No. 6,408,605, all of the above application Ser. Nos. and issued patents being hereby incorporated herein by reference.

TECHNICAL FIELD

The present invention relates to cotton harvesting machines and more particularly to a powered walk-behind cotton harvester row unit suited for use in small cotton fields and in less developed countries where use of larger, more sophisticated and expensive harvesting machines is not feasible or warranted.

BACKGROUND OF THE INVENTION

In agriculturally advanced countries such as the United States of America, in the last century cotton harvesting has evolved from a largely manual task, to a completely automated task, wherein self-propelled machines are used to pick cotton at rates of up to several thousand pounds per hour from many rows of plants simultaneously. Reference in this regard Watkins U.S. Pat. No. 1,763,607 issued Jun. 10, 1930; Fachini et al. U.S. Pat. No. 4,341,423 issued Jul. 27, 1982 to International Harvester Co.; and Covington et al. U.S. Pat. No. 4,993,216 issued Feb. 19, 1991 to J.I. Case Co.

While technological innovation and advancement have led to the use of technologically advanced, large capacity cotton harvesting machines in advanced nations, in poorer, less developed nations, cotton is still largely harvested by hand. Even old, relatively simple cotton harvesters such as disclosed in Watkins U.S. Pat. No. 1,763,607 are not now known to be used in developing countries for harvesting cotton.

One anticipated shortcoming of using a harvester such as shown in Watkins, is the possible abrupt stoppage and jamming of the harvesting mechanism, for instance, due to abrupt stoppage of the wheels, such as if one or both of the wheels become lodged in a ditch or the like, or in the event the harvesting mechanism becomes entangled with thick cotton foliage, weeds, vines or the like. This possibility would appear to be increased if the harvester is only manually powered.

One reason that this is a problem is an apparent lack of ability to disengage the picking apparatus from the drive wheels. The Watkins harvester also has a relatively blunt forward end, such that it would appear that large or wide cotton plants may be difficult to guide and receive into the relatively narrow front opening of the harvester. Also, using more modern harvesting mechanisms including picker rotors including columns of picker spindles and drives for rotating them, doffer columns, and the like, in a harvester such as disclosed in Watkins, would likely make the harvester too heavy to be moved under human power.

Further, it is desirable that spindles or other picking elements of the harvesting apparatus be moving in timed relation to the ground speed of the harvester, so as to enter a cotton plant to remove the cotton therefrom at a speed closely corresponding to the speed of the harvester over the ground. It has been found that if the harvesting mechanism is operating too fast relative to the speed of movement of the plant through the harvester, a result like a threshing effect may occur which can result in the plants being damaged and debarked. In contrast, when the harvesting mechanism operates too slowly relative to ground speed, it has been observed that the plant can be undesirably pulled by the spindles or other harvesting elements, even to such an extent as to partially or completely uproot the plant.

Thus, what is sought is a walk-behind type cotton harvester that overcomes many of the shortcomings and limitations set forth above.

SUMMARY OF THE INVENTION

What is disclosed is a walk-behind cotton harvester that overcomes many of the problems and shortcomings identified above. The present walk-behind cotton harvester generally includes a cotton picker housing having at least one plant lifter mounted forward of the housing and defining a plant row channel extending rearwardly into the housing to a plant compressor sheet, the cotton picker housing being connected to and supported by a plurality of wheels or other elements for movement over a field.

The cotton harvester includes a picker rotor mounted in the cotton picker housing adjacent to the plant row channel and traverse to the compressor sheet. The cotton harvester includes a doffer mounted in the cotton picker housing near the picker rotor for removing picked cotton from the picker rotor and moving the picked cotton to an outlet at the rear of the cotton picker housing. The harvester additionally includes a power unit including an internal combustion engine mounted on or adjacent to the housing and drive elements including an element selectably engageable for rotatably drivingly connecting a rotatable output of the engine to the picker rotor and the doffer for imparting rotation thereto, and drive elements for positively selectably rotatably drivingly connecting the output of the engine to at least one of the wheels so as to rotate the wheel or wheels at a rotational speed at least substantially timed or synchronized with a rotational speed of the picker rotor and doffer.

According to a preferred aspect of the invention, the element selectably engageable for drivingly connecting the output of the engine to the picker rotor and the doffer includes an endless belt encircling pulleys on the engine output and a rotatable input such as a shaft and/or gear train or belt arrangement drivingly connected to the picker rotor and the doffer, the belt being engageable with the pulleys by movement of an idler pulley into engagement with the belt for tensioning it. The drive elements for drivingly connecting the output of the engine to at least one of the wheels is also preferably a belt drive operable by engagement of a positive engagement clutch such as a mechanical toothed clutch. The idler pulley and the clutch are preferably engageable, respectively, by operation of hand levers mounted adjacent to handles of the harvester.

According to a preferred configuration, the plant row channel extends forwardly and rearwardly through the cotton picker housing on one side of a center line of the harvester, beneath the engine, and the picker rotor and the doffer are mounted on an opposite side of the center line. This enables the cotton harvester to be moved in the forward direction for receiving one of two closely spaced rows of

DETAILED DESCRIPTION OF THE INVENTION

Figure 1:
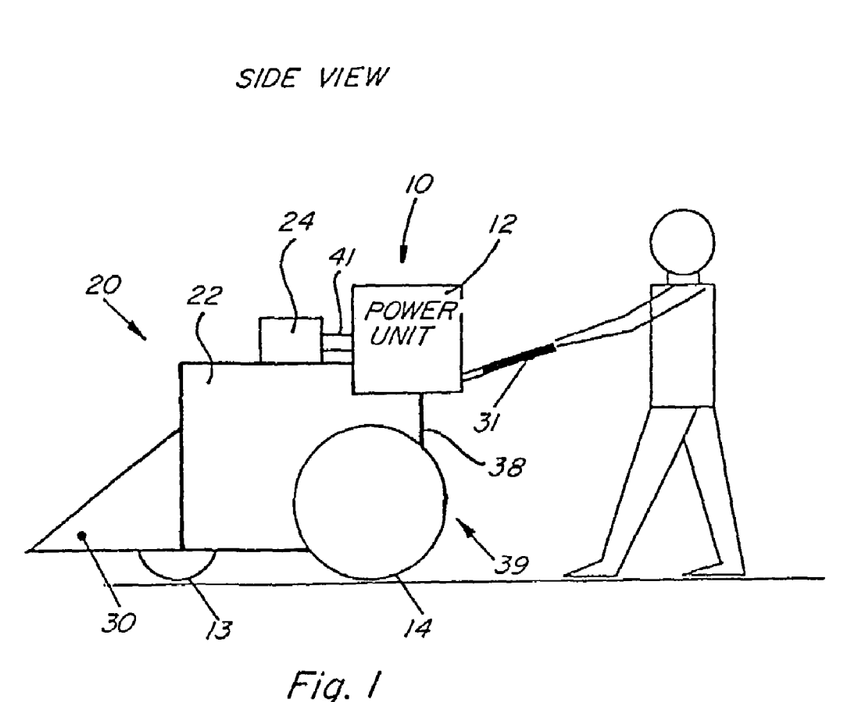
FIG. 1 is a simplified schematic representation of a walk-behind cotton harvester according to the present invention.
Figure 2:
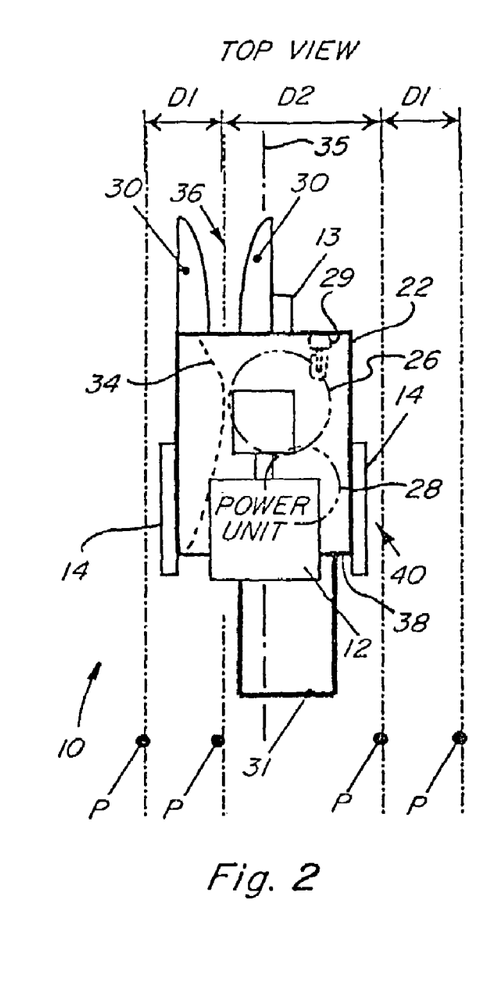
FIG. 2 is a simplified schematic top view of the walk-behind cotton harvester of FIG. 1.
Figure 3:
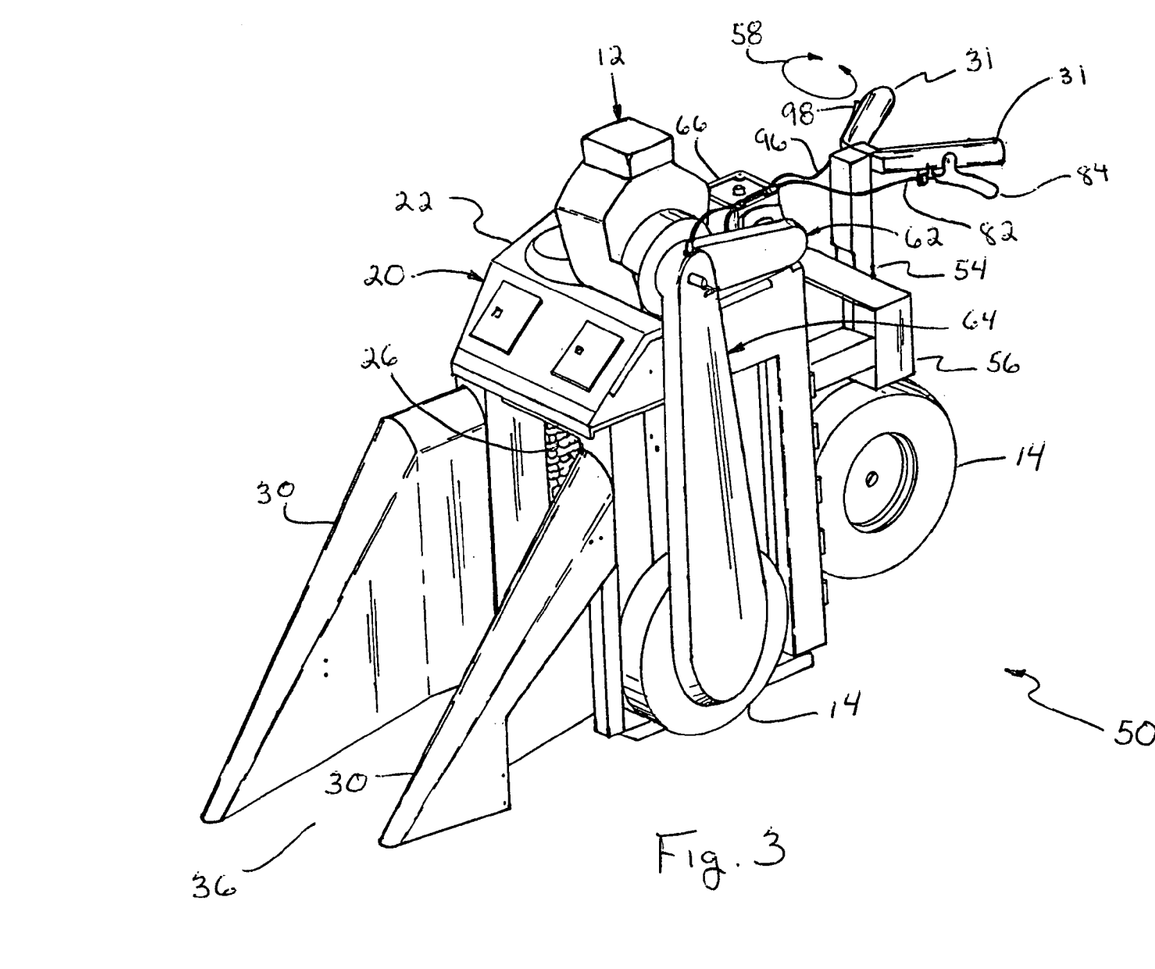
FIG. 3 is a perspective view of another walk-behind cotton harvester according to the invention.
Figure 4:
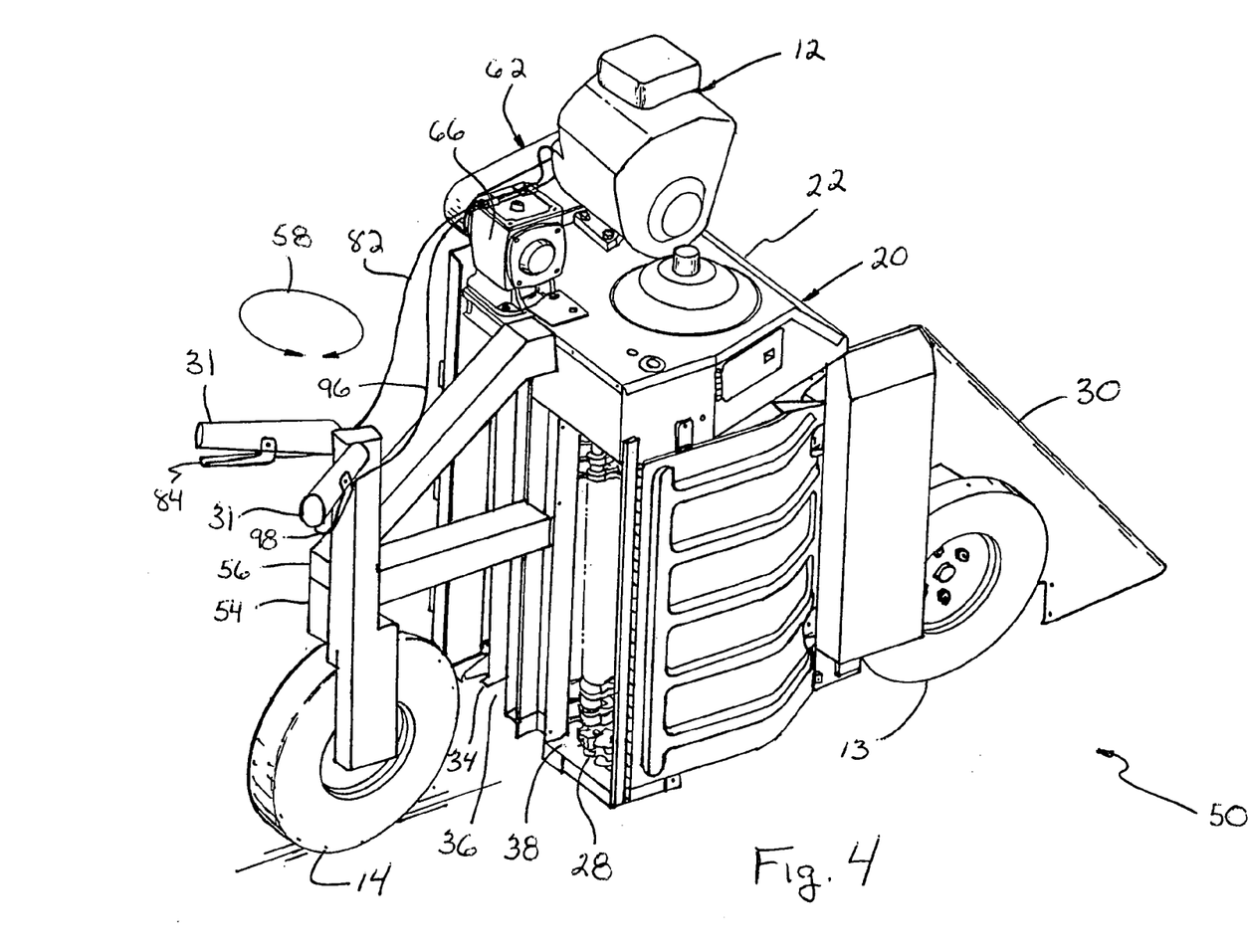
FIG. 4 is another perspective view of the cotton harvester of FIG. 3.
Figure 5:
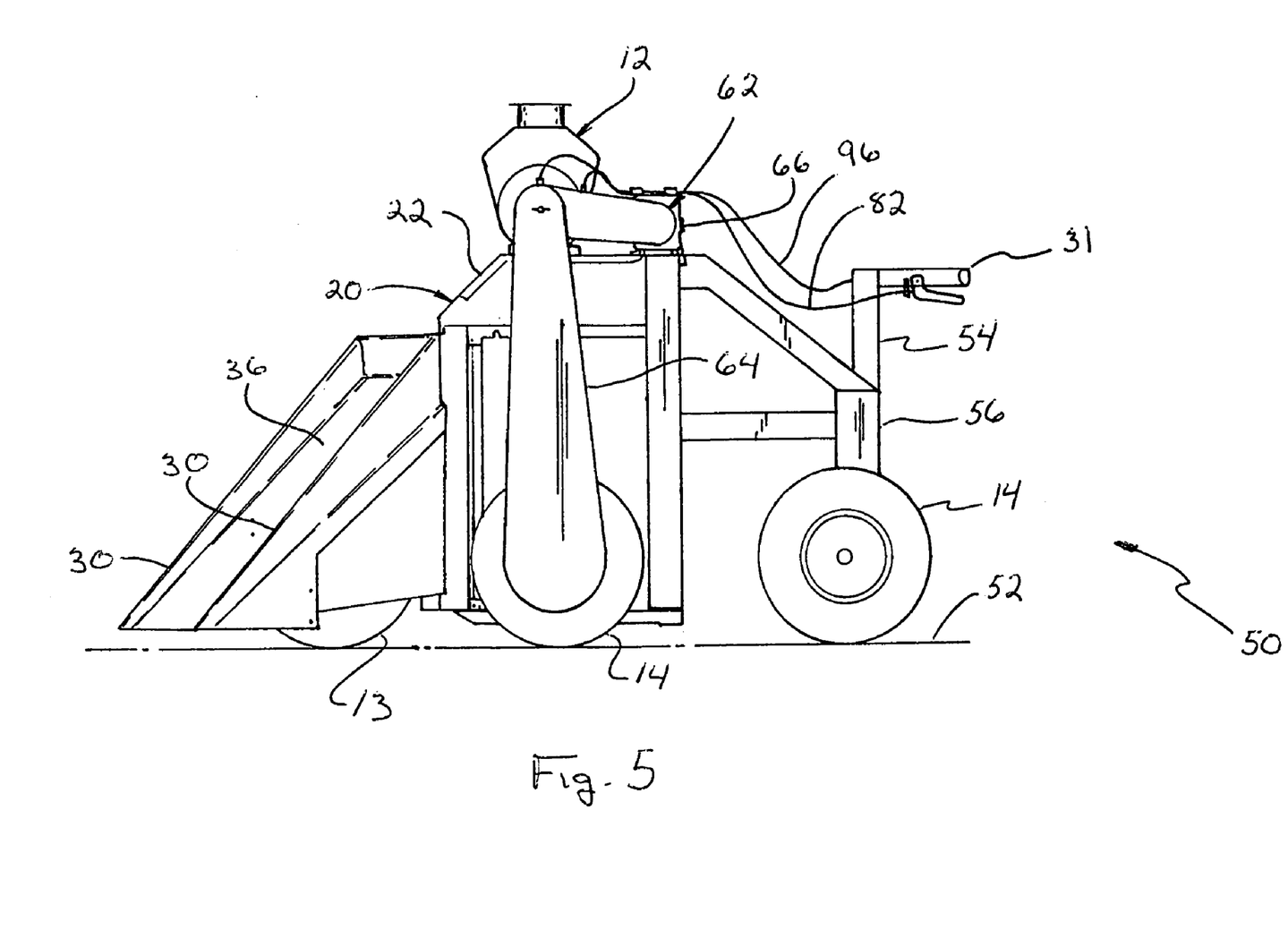
FIG. 5 is a side view of the cotton harvester of FIGS. 3 and 4.

Referring now to the drawings, wherein preferred embodiments of the present invention are shown, in FIGS. 1 and 2 a walk-behind cotton harvester 10 is shown. Walk behind cotton harvester 10 includes a single row cotton picker 20 including a cotton picker housing 22.

A pair of lateral plant lifters 30 are mounted to and extend forwardly of the cotton picker housing 22, defining a plant channel 36 extending back into housing 22 to a plant compressor sheet 34. At least one picker rotor 26 is mounted in cotton picker housing 22 adjacent to plant channel 36 and traverse to plant compressor sheet 34. A corresponding doffer column 28 is mounted in cotton picker housing 22 near picker rotor 26 for facilitating the picking action.

Doffer column 28 removes picked cotton from picker rotor 26 and moves the picked cotton to an outlet 38 at the rear of cotton picker housing 22. A moistening column 29 is preferably disposed in picker housing 22 beside picker rotor 26 for moistening individual spindles or rotor 26. Rotor 26, doffer column 28 and moistener column 29 are all well known elements of cotton pickers such as picker 20.

A power unit 12 is mounted on cotton picker housing 22 and is in mechanical communication with picker rotor 26 and doffer column 28 to impart appropriate rotational motion to such devices. Mounted on cotton picker housing 22 is a means for moving 40 the walk behind cotton harvester 10, means for moving 40 here including a pair of rotatable wheels 14 on opposite sides of picker housing 22 and a forward rotatable wheel 13.

A handle 31 mounted on housing 22 may also be provided. FIGS. 1 and 2 depict the walk-behind harvester 10 in a single row configuration. It should be understood that a multiple row cotton picker unit can be configured as a walk behind harvester.

One embodiment of the walk behind cotton harvester 10 has the means for moving 40 in mechanical communication with the power unit 12 via a drive shaft 41 and a gear box 24. It should be understood that means for moving 40 comprising wheels 13 and 14 are selected from a group also consisting of a pair of tracks or a pair of skids or other low friction elements to allow pulling by an animal or tractor. The wheels, tracks, skids and elements can be of any conventional and convenient style. Wheel 13 can be steerable, to assist the operator in maneuvering walk behind cotton harvester 10.

In an embodiment of the walk behind harvester, power unit 12 can be a hydraulic motor, an electric motor, or a fossil fuel engine, such as an internal combustion engine, in mechanical communication with the means for moving 40. The cotton picked from the cotton plant rows is exhausted into a cotton collecting device (not shown) that can be attached to the walk behind cotton harvester, or towed or maneuvered behind or adjacent thereto, or the picked cotton can be deposited directly onto the ground for subsequent pickup by any convenient method.

Trash such as plant debris can exit through a rear end of plant channel 36, denoted generally at 39. The elements of cotton picker housing 22, including picker rotor 26, doffer column 28, lateral plant lifters 30, plant compressor sheet 34, and plant channel 36, can comprise a cotton picker unit 20 as shown and described in related U.S. patent application Ser. No. 09/511,462, now U.S. Pat. No. 6,408,605, the disclosure in which is incorporated herein by reference.

In FIG. 2, cotton harvester 10 is positioned such that plant channel 36 therethrough is aligned with and receives one row of cotton plants P of a pair of rows of cotton plants spaced a distance D1 apart. This pair of rows is spaced a distance D2 from an adjacent pair of rows P which themselves are also spaced a distance D1 apart. This represents a narrow row cotton planting configuration prevalent in many developing countries particularly in the Peoples Republic of China.

In such a planting pattern, the distance D1 is approximately 30 centimeters and the distance D2 is approximately 60 centimeters. In this view, it can be observed that cotton harvester 10 is of an asymmetrical configuration wherein plant channel 36 is to one side of a front to rear center line 35 of harvester 10, while picker rotor 26 and doffer column 28 are located mostly on an opposite side of the center line 35. Picker rotor 26 includes a plurality of columns of generally horizontally projecting spindles (not shown) that move as the rotor is rotated so as to project across plant channel 36 to adjacent to an opposing surface of compressor sheet 34, so as to be capable of removing cotton from bolls of plants passing through plant channel 36, the cotton plants being compressed laterally with respect to the length of rows P during passage through picker housing 22 in the well known manner to allow a majority of the cotton on the plants to be picked from one side.

In FIGS. 3, 4, 5 and 6, another walk-behind cotton harvester 50 constructed and operable according to the teachings of the present invention is shown, like parts of cotton harvester 50 and cotton harvester 10 being identified by like numbers. Cotton harvester 50 includes a single row picker unit 20 including a picker housing 22 containing a rotatable picker rotor 26 and an associated rotatable doffer column 28, and a moistener column 29. Picker housing 22 as previously described includes a pair of forwardly extending lateral plant lifters 30 defining a plant channel 36 extending rearwardly into housing 22 to a plant compressor sheet 34.

Picker rotor 26 is located adjacent to plant channel 36 traverse to plant compressor sheet 34 so as to be operable in the above-described manner. Doffer column 28 is also mounted in picker housing 22, near picker rotor 26, and removes picked cotton from picker rotor 26 and moves it to an outlet 38 at the rear of cotton picker housing 22, as previously described.

A power unit 12 is mounted on cotton picker housing 22 and is selectably engageable in mechanical connection with picker rotor 26 and doffer column 28 to impart appropriate rotational motion thereto. A plurality of rotatable wheels 13 and 14 are connected to and support picker housing 22 for movement over a surface, such as ground surface 52 of a cotton field. A rearmost of wheels 14 is rotatably mounted to the bottom of a generally upstanding column 54 connected to a rear support structure 56. Column 54 and rearwardly located wheel 14 are preferably connected to rear support structure 56 for rotatable or pivotable movement as denoted by arrow 58, column 54 including handles 31 to allow steering harvester 50.

Figure 6:
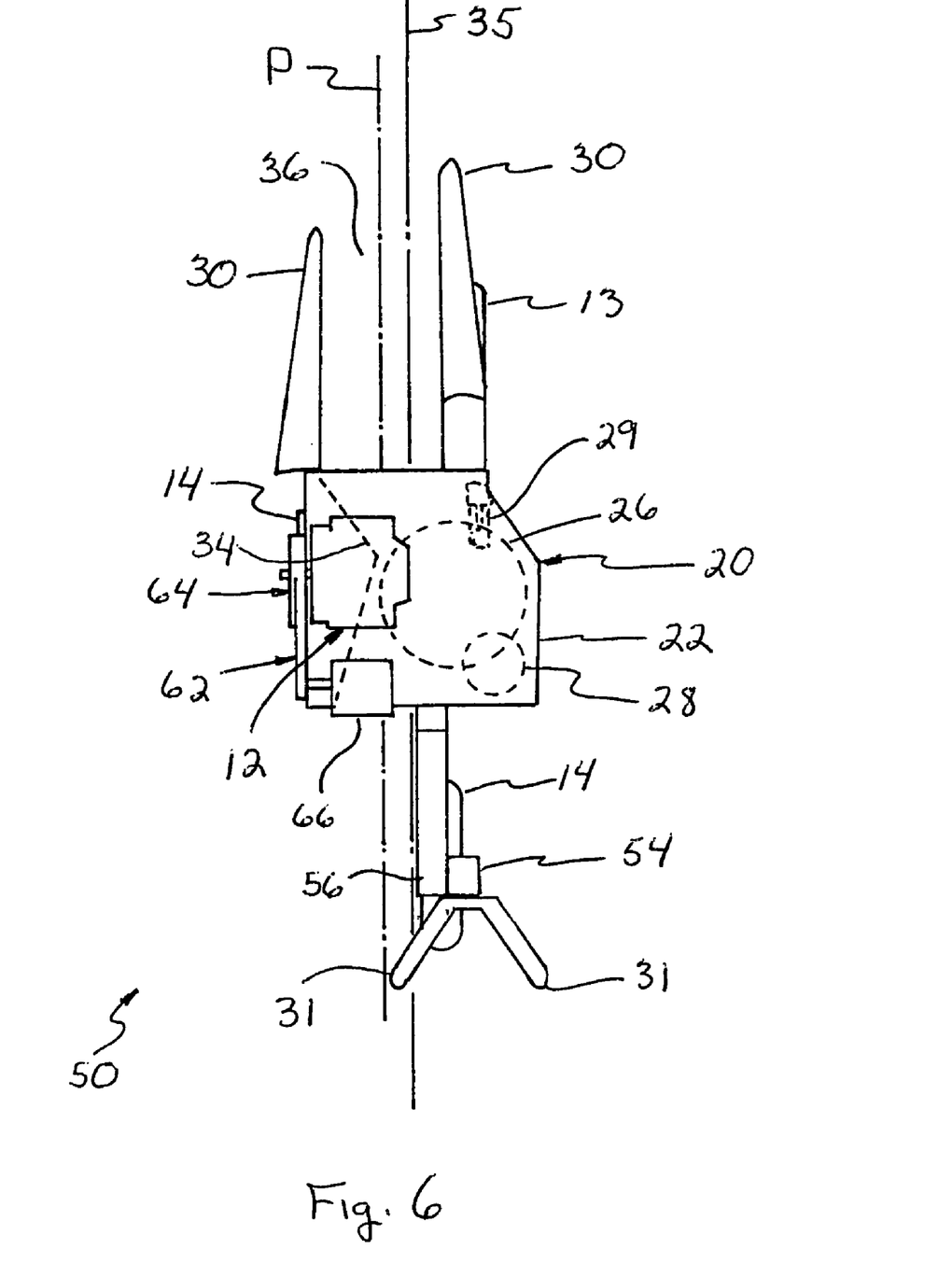
FIG. 6 is a simplified schematic top view of the harvester of FIGS. 3 and 4.

Referring more particularly to FIG. 6, which is a top view of harvester 50, it can be seen that harvester 50, like harvester 10 is of an asymmetrical configuration, wherein power unit 12 is located generally above plant channel 36 which extends more along one side of a forward to rearward center line 35 through picker housing 22, rotor 26, doffer column 28 and moistener column 29 being located in an opposite side of housing 22. This facilitates usage in the manner described in reference to harvester 10 in a cotton field planted in rows P such as depicted in FIG. 1.

Figure 7:
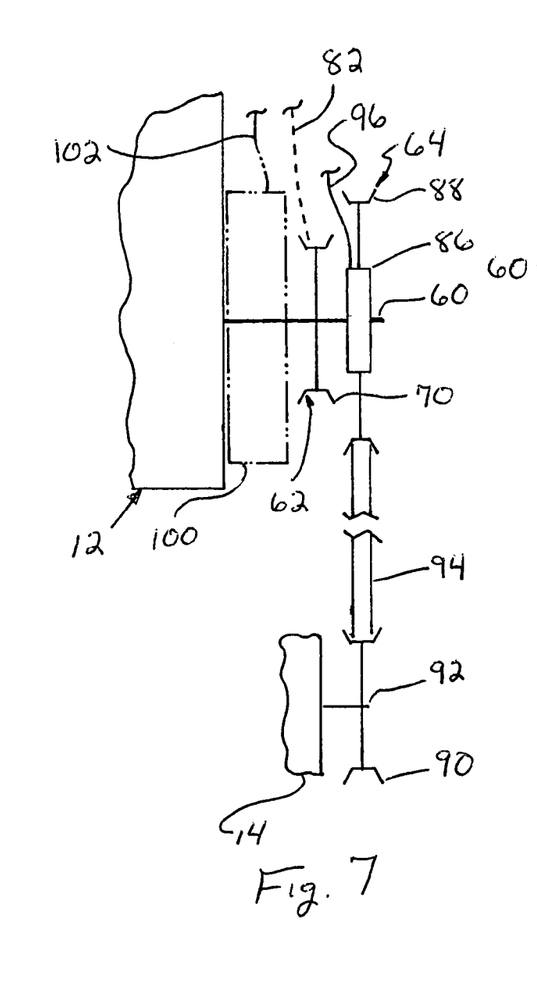
FIG. 7 is a simplified schematic representation of drive elements of the cotton harvester of FIGS. 3, 4, 5 and 6, showing an optional transmission at one possible location.
Figure 8:
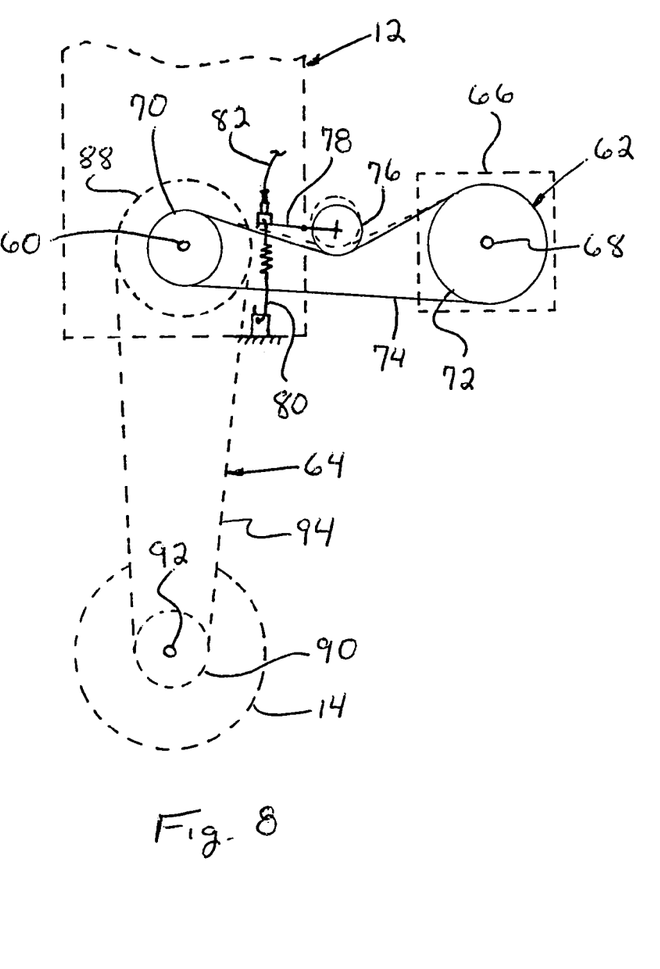
FIG. 8 is a simplified schematic representation of aspects of the drive elements.

Referring also to FIGS. 7 and 8, the engine of power unit 12 includes a rotatable output 60 selectably connectable in rotatably driving relation to picker rotor 26 and doffer column 28 for imparting rotation thereto, by a picker unit drive 62. Output 60 is additionally connectable in rotatably driving relation by a wheel drive 64 to a selected wheel 14 generally beneath power unit 12. Picker unit 20 includes a gear arrangement (not shown) disposed in picker housing 22 generally above picker rotor 26 and doffer column 28 in the well known manner.

Harvester 50 includes an input gear box 66 on top of picker housing 22 connected in rotatably driving relation to the gear arrangement. Gear box 66 is a conventional, commercially available right angle gear box, including a rotatable input 68, and a rotatable output (not shown) which connects to the gear arrangement.

Picker unit drive 62 includes an input pulley 70 mounted on output 60 of the engine of power unit 12 for rotation therewith, and an output pulley 72 mounted on input 68 of gear box 66 for rotation therewith. An endless belt 74 encircles pulley 70 and 72. An idler pulley 76 is mounted for rotation on one end of an idler arm 78 mounted for pivotal movement at a convenient location, such as shown on power unit 12, for pivotal movement of idler pulley 76 into biased rotating engagement with belt 74 (solid lines) for drivingly connecting pulleys 70 and 72 for engaging picker unit drive 62, and a less or unbiased position (dotted lines) such that belt 74 affords slippage sufficient for disengagement of picker unit drive 62 such that pulley 70 does not drive pulley 72.

A biasing element 80, which can be a suitable conventional spring or the like, is connected between an opposite end of idler arm 78 and a suitable structure, such as power unit 12, for yieldably urging pivotal movement of idler arm 78 in a counterclockwise direction away from belt 74. A control cable 82 is connected between idler arm 78 and a control lever 84 on one of handles 31, squeezing of lever 84 toward handle 31 operating to pull idler arm 78 in opposition to biasing element 80 to pivot idler pulley 78 into biased engagement with belt 74 for placing sufficient tension in the belt for driveably connecting pulley 70 to pulley 72 for driveably engaging picker unit drive 62.

Wheel drive 64 includes a positive engagement clutch 86, such as a conventional, commercially available mechanical toothed clutch, mounted on output 60 of the engine of power unit 12 and carrying a pulley 88 which rotates with output 60 when clutch 86 is selectably engaged, and which allows free rotation of output 60 when clutch 86 is disengaged.

Drive 64 includes a pulley 90 mounted on an input 92 such as an axle or the like of wheel 14 for rotation therewith. An endless belt 94 encircles pulleys 88 and 90, such that when clutch 86 is engaged, wheel 14 will be driven via drive 64 by output 60 of the engine of power unit 12. Clutch 86 is connected by a control cable 96 to a control lever 98 on a handle 31, lever 98 being movable for engaging and disengaging clutch 86 in the conventional manner.

It should be noted that output 60 of the engine of power unit 12 can be optionally outfitted with a transmission 100 operable via a control cable 102 extending to a selector (not shown) for reversing the direction of rotation of that portion or portions of output 60 that connect to picker unit drive 62 and wheel drive 64. Transmission 100 can also include a neutral position.

In operation, it is desired that picker rotor 26 of both harvester 10 and harvester 50 rotate at a speed such that the picker spindles pass through plant channel 36 at substantially the speed of cotton plants moving therethrough. This is desirable and advantageous because if the spindles are moving too fast, they can thresh the cotton plants, so as to cause damage such as breakage and debarking.

At slower rotation speeds compared to ground speed, the spindles can impede passage of the plants through channel 36, and if the rotational speed is too slow, the rotors can even partially or completely uproot plants by retaining them in channel 36 even as harvester 10 or 50 continues to move. Synchronization or timing of ground speed to the rotational speed of picker rotor 26 is satisfactorily achieved by positive engagement of wheel drive 64 by clutch 86, which, as noted above, is preferably a positive engagement device such as, but not limited to, a mechanical tooth clutch, but which could also be a shiftable gearbox, or the like.

Satisfactory picking can also be achieved by manually attempting to correlate ground speed and picker rotor speed, and observing the picked cotton, and plants exiting the harvester. Examples of speeds contemplated include a 2 to 2.5 mile per hour ground speed, and about a 100 revolutions per minute rotor speed. The provision of selectably engageable idler pulley 76 and clutch 86 enables engaging and disengaging drives 62 and 64 as required for difficult situations, such as when the harvester begins to bog down due to heavy foliage, induction of vines, weeds and the like.

The provision of optional transmission 100 is also a desirable feature, as, for instance, at initiation of operation, picker unit drive 62 can be engaged before wheel drive 64 to bring the rotor and doffer up to operating speed, then the wheel drive engaged for movement of the harvester along a field to a row of cotton plants to be picked. Also, at the end of a harvesting session, picker unit drive 62 can be disengaged, while wheel drive 64 remains engaged, for movement away from the harvested rows.

Still further, the ability to drive both the driven wheel and the picker rotor in a reverse direction may be desirable, for untangling the rotor from vines and other foliage, and for moving the harvester rearwardly for aligning with a plant row. In this regard, it is anticipated that cotton harvesters 10 and 50 can weigh several hundred pounds, which would make manual movement burdensome and difficult.

It should be additionally noted that although drives 62 and 64 are depicted as belt drives, other drives, such as chain drives, shaft drives, fluid drives, or combinations of the above, can be used.

As an additional item, cotton harvesters 10 and 50 can include a container (not shown) for holding water or other liquid for use in moistener column 29. Such container can be located internal or external to picker housing 22, and can be removable for filling and cleaning at a location remote from the harvester. Preferably, the container would be located above moistener column 29 for gravity flow of the water or other liquid to column 29. Like harvester 10, harvester 50 can include a cotton collecting device (not shown) that can be attached to the rear end, towed or maneuvered behind or adjacent thereto.

As another feature, it should be noted that on harvester 50 wheel 13 is located forwardly of picker housing 22, which serves to maintain the bottoms of plant lifters 30 in spaced relation above a surface such as ground surface 52 over which harvester 50 is moved, at least when such surface is relatively level, such that the forward ends of lifters 30 are less likely to contact the ground.

It should also be noted that the location of handles 31 and rearwardly located wheel 14 adjacent a rearward end of rear support structure 56, which extends a relatively large distance rearwardly from picker housing 22, affords an operator leverage or mechanical advantage so as to reduce the effort required to steer harvester 50. This location also allows the operator to be located a corresponding distance from the rear of housing 22 so as to be able to better observe picked cotton, plant residue and other material exiting harvester 50 during operation thereof. This location also affords better protection against rearward tipping, and a better ability to exert leverage against harvester 50 in the event the forward end falls into a ditch, depression, hole or the like.

It will be understood that changes in the details, materials, steps, and arrangements of parts which have been described and illustrated to explain the nature of the invention will occur to and may be made by those skilled in the art upon a reading of this disclosure within the principles and scope of the invention.

The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A walk-behind cotton harvester comprising:
   a cotton picker housing having at least one plant lifter mounted forward of the housing and defining a plant row channel extending rearwardly through the housing;
   a plant compressor sheet in the housing extending along at least a portion of one side of the plant row channel;
   a picker rotor assembly, the picker rotor assembly consisting of a single picker rotor mounted in the cotton picker housing adjacent to the plant row channel and traverse to the plant compressor sheet, the single picker rotor limiting total weight of the walk-behind cotton harvester and allowing a plant to be picked only one time by the harvester, thereby allowing for manual movement of the walk-behind cotton harvester in small cotton fields and yielding a cotton harvest with less plant trash than a cotton harvest produced from a plant picked more than one time by more than one picker rotor;
   a doffer mounted in the housing adjacent to the single picker rotor for removing picked cotton from the single picker rotor and moving the picked cotton to an outlet adjacent to the rear of the housing;
   a power unit including an internal combustion engine mounted on the housing, the engine including a rotatable output;
   a first drive including an element selectably engageable for connecting the output of the engine in rotatably driving relation to the single picker rotor and the doffer for imparting rotation thereto;
   a second drive including an element selectably engageable for connecting the output of the engine in rotatably driving relation to at least one rotatable wheel of the harvester for moving the harvester over a surface;
   a rotatable support wheel coupled to the housing is located forward of the housing, the support wheel is disposed underneath the at least one plant lifter for supporting the at least one plant lifter a spaced distance above a surface on which the support wheel is supported, the support wheel being in a non-driving relation with the output of the engine; and
   handles connected to the rotatable wheel for rotating the wheel relative to the structure and the picker housing for steering the harvester.

2. The harvester of claim 1, wherein the power unit includes a mechanism in connection with the rotatable output of the engine operable for reversing directions of rotation of the single picker rotor and the doffer and the at least one wheel respectively.

3. The harvester of claim 2, wherein the element for reversing the rotation comprises a shiftable transmission.

4. The harvester of claim 1, wherein the second drive will rotate the at least one wheel at a rotational speed at about a predetermined ratio to a rotational speed of the single picker rotor.

5. A walk-behind cotton harvester comprising:
   a cotton picker housing having at least one plant lifter mounted forward of the housing and defining a plant row channel extending back into the housing to a single plant compressor sheet;
   a picker rotor assembly, the picker rotor assembly consisting of a single picker rotor mounted in the cotton picker housing adjacent to the plant row channel and traverse to the plant compressor sheet, the single picker rotor limiting total weight of the walk-behind cotton harvester and allowing a plant to be picked only one time by the harvester, thereby allowing for manual movement of the walk-behind cotton harvester in small cotton fields and yielding a cotton harvest with less plant trash than a cotton harvest produced from a plant picked more than one time by more than one picker rotor;
   a doffer mounted in the cotton picket housing near the single picker rotor for removing picked cotton from the single picker rotor and moving the picked cotton to an outlet at the rear of the cotton picker housing;
   a power unit including an internal combustion engine mounted on the housing including a rotatable output selectably connectable in rotatably driving relation to the single picker rotor and the doffer for imparting rotation thereto;
   a plurality of wheels mounted to the harvester for rotation relative thereto, and a drive connected between the rotatable output of the engine and at least one of the wheels selectably engageable far imparting rotation to the at least one of the wheels;

a rotatable support wheel is coupled to the at least one plant lifter, the support wheel is located forward of the housing, the support wheel is disposed underneath the at least one plant lifter for supporting the at least one plant lifter a spaced distance above a surface on which the support wheel is supported, the support wheel being in a non-driving relation with the output of the engine; and at least one handle connected to the housing, and controls located adjacent to the at least one handle connected to an element selectably operable for connecting the output of the engine in rotatably driving relation to the single picker rotor and the doffer, and to at least one element of the drive selectably operable for connecting the output in rotatably driving relation to the at least one of the wheels, respectively.

6. The harvester of claim 5, wherein the drive includes a selectably engageable positive engagement clutch.

7. The harvester of claim 5, wherein the output of the engine includes a transmission including at least a first operating mode wherein the single picker rotor and the doffer are rotated in first rotational directions, and a second operating mode wherein the single picker rotor and the doffer are rotated in second rotational directions opposite the first rotational directions.

8. The cotton harvester of claim 5, wherein the single picker rotor and the doffer are mounted generally within one forward to rearward extending side of the picker housing, and the plant row channel extends forwardly to rearwardly through the housing adjacent an opposite side thereof.

9. The harvester of claim 5, wherein the plant compressor sheet extends forwardly to rearwardly within the housing adjacent to the opposite side thereof.

10. The harvester of claim 5, including a moistener column located adjacent to the single picker rotor for moistening spindles thereof as the single picker rotor is rotated.

11. The harvester of claim 5, wherein the at least one handle is mounted on an element extending rearwardly from the picker housing, the at least one handle being graspable and movable for allowing steering the harvester.

12. The harvester of claim 11, wherein the at least one handle is connected to said element for pivotable or rotational movement relative thereto in a generally horizontal plane, the handle further being connected to a wheel disposed beneath said element for pivotable or rotational movement with the at least one handle to facilitate the steering of the harvester.

13. The harvester of claim 5, wherein the output of the engine is selectably connectable in rotatably driving relation to the single picker rotor and the doffer by a drive including at least one belt and an idler mechanism selectably movable for tensioning and detensioning the belt.

14. A walk-behind cotton harvester comprising:

a cotton picker housing having at least one plant lifter member mounted forward of the housing arid defining a plant row channel extending back into the housing to a single plant compressor sheet;

a picker rotor assembly, the picker rotor assembly consisting of a single picker rotor mounted in the cotton picker housing adjacent to the plant row channel and traverse to the plant compressor sheet, the single picker rotor limiting total weight of the walk-behind cotton harvester and allowing a plant to be picked only one time by the harvester, thereby allowing for manual movement of the walk-behind cotton harvester in small cotton fields and yielding a cotton harvest with less plant trash than a cotton harvest produced from a plant picked more than one time by more than one picker rotor;

a doffer mounted in the cotton picker housing near the single picker rotor for removing picked cotton from the single picker rotor and moving the picked cotton to an outlet at the rear of the cotton picker housing;

a power unit including an internal combustion engine mounted on the housing including a rotatable output selectably connectable in rotatably driving relation to the single picker rotor and the doffer for imparting rotation thereto;

a plurality of wheels mounted to the harvester for rotation relative thereto, and a drive connected between the rotatable output of the engine and at least one of the wheels selectably engageable for imparting rotation to the at least one of wheels; and a rotatable support wheel is coupled to the at least one plant lifter, the support wheel is located forward of the housing, the support wheel is disposed underneath the at least one plant lifter member for supporting the at least one plant lifter member a spaced distance above a surface on which the support wheel is supported, the support wheel being in a non-driving relation with the output of the engine.

15. The harvester of claim 14, wherein the harvester further comprises a transmission coupled to the power unit, the transmission operable to selectively reverse the direction of rotation of the rotatable output.

16. The harvester of claim 15, wherein the harvester further comprises at least one handle connected to the housing, and controls located adjacent to the at least one handle, the controls coupled to the transmission to selectively control the direction of rotation of the rotatable output.

* * * * *